W. H. HOLLAND.
Improvement in Metallic Stuffing Boxes.
No. 123,173. Patented Jan. 30, 1872.
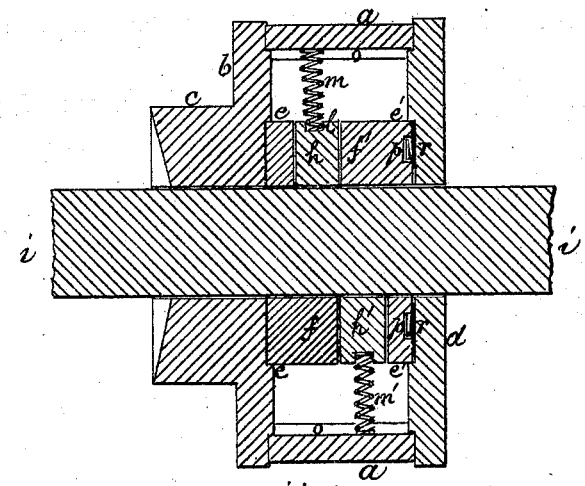
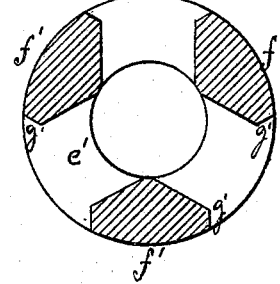
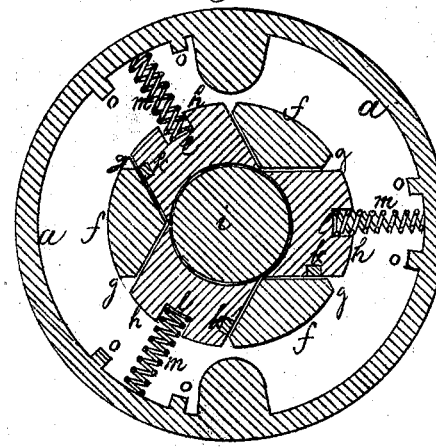 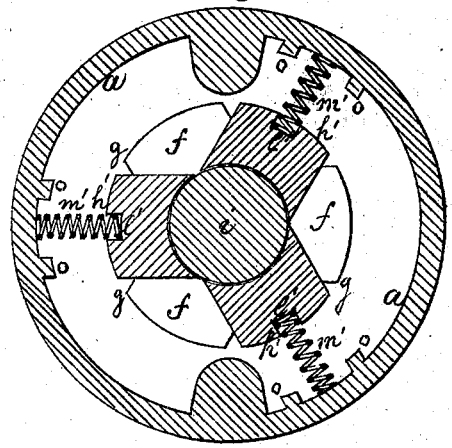
Witnesses
Saml. M. Barton.
Jesse F. Wheeler
Inventor
Wm. H. Holland
by his atty
Carroll D. Wright

UNITED STATES PATENT OFFICE.

WILLIAM H. HOLLAND, OF BOSTON, MASSACHUSETTS.

IMPROVEMENT IN METALLIC STUFFING-BOXES.

Specification forming part of Letters Patent No. 123,173, dated January 30, 1872.

SPECIFICATION.

I, WILLIAM H. HOLLAND, of Boston, in the county of Suffolk and State of Massachusetts, have invented certain Improvements in Metallic Stuffing-Boxes, of which the following is a specification:

Figure 1 in the drawing represents a longitudinal central vertical section of my improved metallic stuffing-box; and Figs. 2, 3, and 4 are transverse vertical sections of portions of the same.

The present invention relates to certain new and useful improvements in metallic stuffing-boxes; and has for its main object the providing a durable and tight packing for piston-rod valves, &c. My improvements consist of so arranging and operating certain devices, to be hereinafter fully explained, as to effectually close the joints between and around them against the escape of steam, &c., and, at the same time, to provide a means by which the wear caused by the friction upon the several devices will in nowise affect the perfect operation of the devices composing the packing.

$a\ a$ in the drawing represents the case of a stuffing-box, which is provided with an inner lid or cover, $b$, having a gland, $c$, and has also an outer lid or cover, $d$. Against the inside of the inner lid $b$ is a ring, $e\ e$, formed with three permanent triangular-shaped pieces or wedges, $f\ f\ f$, with squared corners, as shown at $g\ g\ g\ g'\ g'\ g'$, so as to allow of the admittance between them of blocks or segments, $h\ h\ h$, formed with a curved face, so as to fit around a piston-rod, $i\ i$, which passes through the center of the wedges $f\ f\ f$ and the blocks or segments $h\ h\ h$. The blocks or segments $h\ h\ h$ are provided with packing pieces $k\ k\ k$ in the side of each for the purpose of taking up the side wear that may probably occur from the side friction of the segments $h\ h\ h$ and wedges $f\ f\ f$, and to prevent the escape of steam, &c., over the top and up through the joints between them. Formed in the outer periphery of the segments $h\ h\ h$ are bearings $l\ l\ l$ for the ends of spiral or other springs $m\ m\ m$, the opposite ends of which find a bearing against the inner periphery of the stuffing-box case $a\ a$, which is provided with ribs $o\ o\ o\ o\ o$, in which pieces are inserted to steadily hold the springs $m\ m\ m$. Placed against the wedges $f\ f\ f$ and segments $h\ h\ h$, so as to break joints with them, as shown in Fig. 3, are similar immovable wedges $f'\ f'\ f'$, attached to a ring, $e'\ e'$, provided with similar segments $h'\ h'\ h'$, fitting between the wedges $f'\ f'\ f'$, and operated by similar springs $m'\ m'\ m'$, with bearings $l'\ l'\ l'$ formed in the outer periphery of the segments $h'\ h'\ h'$. In the back of the ring $e'\ e'$ bearings are formed for the reception of springs $p\ p$, which serve to bear against a washer or circular packing-ring, $r\ r$, fitting between the ring $e'\ e'$ and the inside of the outer lid $d$.

Reference being had to the drawing it will be seen that the triangular form of the wedges $f\ f\ f\ f'\ f'\ f'$ is to prevent the opening of the joints, which is a difficulty almost impossible to obviate when the projections are made of another shape, for then they form merely segments of a ring, and the space between the ends of each segment continually enlarges by the constant friction and admits a pressure of steam between each joint, whereas by the present arrangement the wear of the wedges $f\ f\ f\ f'\ f'\ f'$ is taken up by the pressure of the springs $m\ m\ m\ m'\ m'\ m'$ or of steam against the back of the segments $h\ h\ h\ h'\ h'\ h'$, so that the sides of the latter are at all times made to hug tightly against the sides of the wedges $f\ f\ f\ f'\ f'\ f'$ and around the piston-rod $i\ i$. Moreover, the above arrangement admits of the complete wearing up of the segments $h\ h\ h\ h'\ h'\ h'$, they being pressed into the apertures formed between the wedges $f\ f\ f\ f'\ f'\ f'$ as fast as any portion is worn away, and thus kept at all times in proper position by means of the springs $m\ m\ m\ m'\ m'\ m'$, or by steam operating against the outer periphery of the segments $h\ h\ h\ h'\ h'\ h'$, and the side wear being taken up by the packing pieces $k\ k\ k$.

If by any possibility the steam should escape through the joints between and around the wedges $f\ f\ f$ and segments $h\ h\ h$ of the inner ring $e\ e$, the wedges $f'\ f'\ f'$ and segments $h'\ h'\ h'$ of the outer ring $e'\ e'$, placed above the others so as to break joints with them, will prevent the further escape of steam, &c.; and to provide against any yet further contingency the packing-ring or washer $r\ r$, acted upon by the spring $p\ p$, is made to bear tightly against the outer cover $d$, so that the escape of the steam, &c., is effectually prevented; the pressure of the springs $p\ p$ on the outer ring $e'\ e'$ serving to close tightly the joints between the faces and backs of the wedges $f\ f\ f\ f'\ f'\ f'$ and segments $h\ h\ h\ h'\ h'\ h'$, and also to take up any wear that may occur to the said faces and backs.

Having thus fully described my improvements, what I claim as my invention, and desire to have secured to me by Letters Patent, is—

1. A metallic stuffing-box, $a\,a$, formed with ribs $o\ o\ o\ o\ o\ o$, and provided with rings $e\,e\,c'\,e'$, formed with permanent wedges $f\ f\ f\ f'\ f'\ f'$, between which fit blocks or segments $h\ h\ h\ h'\ h'\ h'$, having packing pieces $k\ k\ k$, the said segments $h\ h\ h\ h'\ h'\ h'$ being operated by springs $m\ m\ m\ m'\ m'\ m'$ or steam pressing against the outer periphery of the said blocks or segments, substantially as specified.

2. The rings $e\ e\ e'\ e'$, formed with immovable triangular projections or wedges $f\ f\ f\ f'\ f'\ f'$, with cut corners $g\ g\ g\ g'\ g'\ g'$, so as to receive the segments $h\ h\ h\ h'\ h'\ h'$, substantially as specified.

3. The segments $h\ h\ h\ h'\ h'\ h'$, formed with bearings for the reception of the springs $m\ m\ m\ m'\ m'\ m'$, and provided with packing pieces $k\ k\ k$, and operating between the wedges $f\ f\ f\ f'\ f'\ f'$ and against the piston-rod $i\ i$, substantially as specified.

4. The case $a$, segments $h\ h'$, wedges $f\ f'$, springs $m\ m'\ p$, rings $e\ e'$, and washer $r$, arranged as specified.

In testimony whereof I have signed my name to this specification in the presence of two subscribing witnesses.

WM. H. HOLLAND.

Witnesses:
 SAML. M. BARTON,
 CARROLL D. WRIGHT.